(12) United States Patent
Gabay et al.

(10) Patent No.: US 11,916,700 B2
(45) Date of Patent: Feb. 27, 2024

(54) AUTOCONNECT VIRTUAL PRIVATE NETWORK

(71) Applicant: Comcast Cable Communications, LLC, Philadelphia, PA (US)

(72) Inventors: Benzy Gabay, Sunnyvale, CA (US); Albert Ribe Costa, San Mateo, CA (US); Carlo Treves, San Jose, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 275 days.

(21) Appl. No.: 17/187,045

(22) Filed: Feb. 26, 2021

(65) Prior Publication Data

US 2022/0278874 A1 Sep. 1, 2022

(51) Int. Cl.
*H04L 12/46* (2006.01)
*H04W 76/10* (2018.01)

(52) U.S. Cl.
CPC ......... *H04L 12/4641* (2013.01); *H04W 76/10* (2018.02)

(58) Field of Classification Search
None
See application file for complete search history.

(56) References Cited

U.S. PATENT DOCUMENTS

| | | | |
|---|---|---|---|
| 8,949,968 B2 | 2/2015 | Wei et al. | |
| 10,205,705 B2 | 2/2019 | Bakthavathsalu et al. | |
| 10,243,999 B2 | 3/2019 | Mahaffey et al. | |
| 2004/0223498 A1* | 11/2004 | Sanderson | H04L 12/4641 370/465 |
| 2010/0115605 A1* | 5/2010 | Beattie | H04L 47/785 709/229 |
| 2014/0137206 A1* | 5/2014 | Hansmann | H04W 12/04 726/4 |
| 2017/0099159 A1* | 4/2017 | Abraham | H04L 45/54 |
| 2018/0213574 A1* | 7/2018 | Bareket | H04W 40/246 |

* cited by examiner

*Primary Examiner* — Christine T Duong
(74) *Attorney, Agent, or Firm* — Banner & Witcoff, Ltd.

(57) ABSTRACT

Systems, apparatuses, and methods are described for automatically establishing a virtual private network (VPN) based on detecting a connection to a public network. A computing device may detect a connection to a public network. The computing device may determine whether the connection to the public network is secured and/or may determine a quality of that connection. If the connection is unsecure and/or if the quality satisfies a quality threshold, the computing device may establish a VPN session.

42 Claims, 12 Drawing Sheets

300

US 11,916,700 B2

AUTOCONNECT VIRTUAL PRIVATE NETWORK

BACKGROUND

People connect to public networks every day, for example, when visiting their local coffee shop or shopping at their local grocery store. However, most of these public networks are unsecured. This can expose an individual's personal information and/or confidential professional information to malicious actors (e.g., hackers).

SUMMARY

The following summary presents a simplified summary of certain features. The summary is not an extensive overview and is not intended to identify key or critical elements.

Systems, apparatuses, and methods are described for automatically establishing a secure virtual private network (VPN) session for a computing device connected to a public network. The computing device may determine that the connection to the public network is unsecured. The computing device may also evaluate the connection between the computing device and the public network to determine a quality of the connection. If the public network is unsecured and the connection is of a predetermined quality, the computing device may establish a VPN session with a trusted server. By automatically establishing the VPN session, the computing device may secure the computing device without any user intervention and prevent a malicious actor (e.g., a hacker) from intercepting (e.g., sniffing) network traffic to obtain information about a user of the computing device. Moreover, the VPN session may prevent data leakage and secure the user's privacy. These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
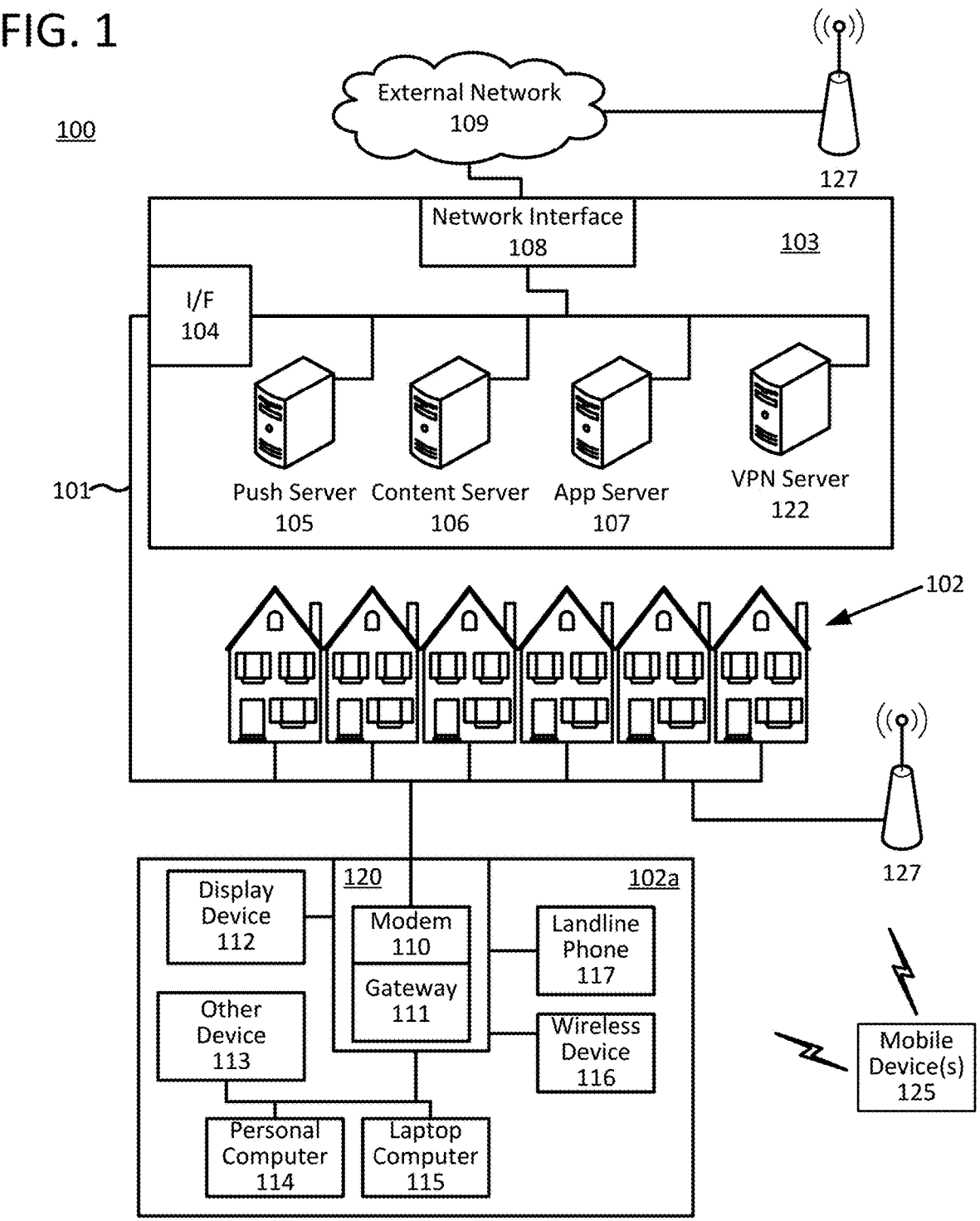
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

Mobile devices connect to public networks multiple times a day. As noted above, most of these public networks are unsecured, which may cause an individual's personal information and/or confidential professional information to be exposed to malicious actors (e.g., hackers). By way of introduction, features discussed herein may relate to methods, devices, systems, and/or computer-readable media for automatically establishing a VPN connection with a trusted VPN server, for example, based on detecting that a mobile device has connected to an unsecured network. The mobile device, or an application executing on the mobile device, may detect the connection to the public network and determine that the connection is unsecured. The mobile device may evaluate the connection between the computing device and the public network to determine whether a quality of the connection is sufficient to support a VPN connection. If the public network is unsecured and the connection is of a predetermined quality, the mobile device may establish a VPN session with a trusted server to prevent malicious actors from intercepting network traffic.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets, laptop computing devices, gaming consoles, electronic readers ("e-readers"), wearable devices (e.g., a smart watches, a head-mounted computing devices, etc.), or any other suitable portable computing device with wireless transceivers, tablets, or laptop computing device communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107 and 122, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as the virtual private network (VPN) server 122 (described below), additional push, content, and/or application servers, and/or other types of servers. VPN server 122 may be a trusted server configured to establish one or more VPN connections with one or more computing devices. The computing device may generate a symmetric key. In this regard, VPN server 122 may be configured to authenticate a computing device prior to establishing a VPN connection. Additionally or alternatively, VPN server 122 may be configured to encrypt and decrypt data and/or information exchanged with the one or more computing devices. VPN server 122 may act as a proxy server for the one or more computing devices. Although shown separately, the push server 105, the content server 106, the application server 107, the VPN server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets, and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
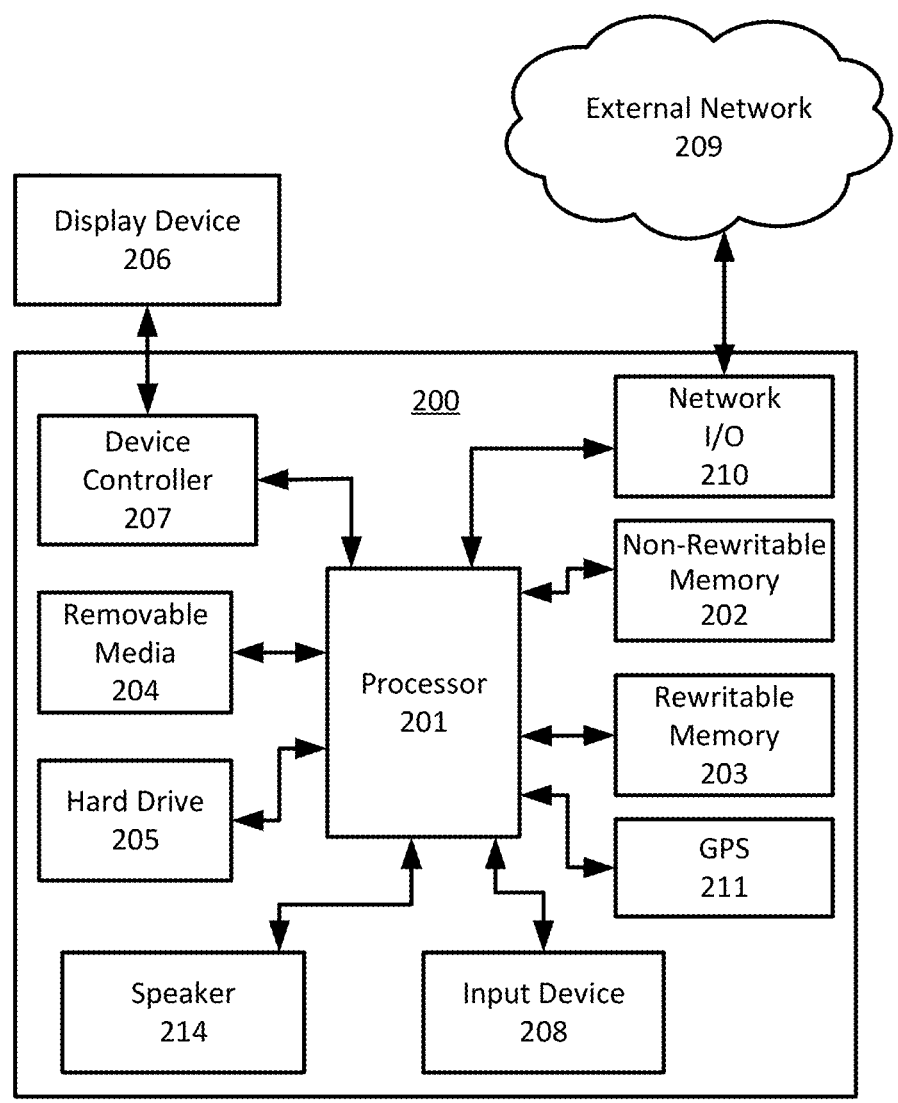
FIG. 2 shows hardware elements of an example computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices associated with the external network 109) and any other computing devices discussed herein (e.g., smart phones, tablets, laptop computing devices, gaming consoles, e-readers, wearable devices (e.g., a smart watches, a head-mounted computing devices, etc.), etc.). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
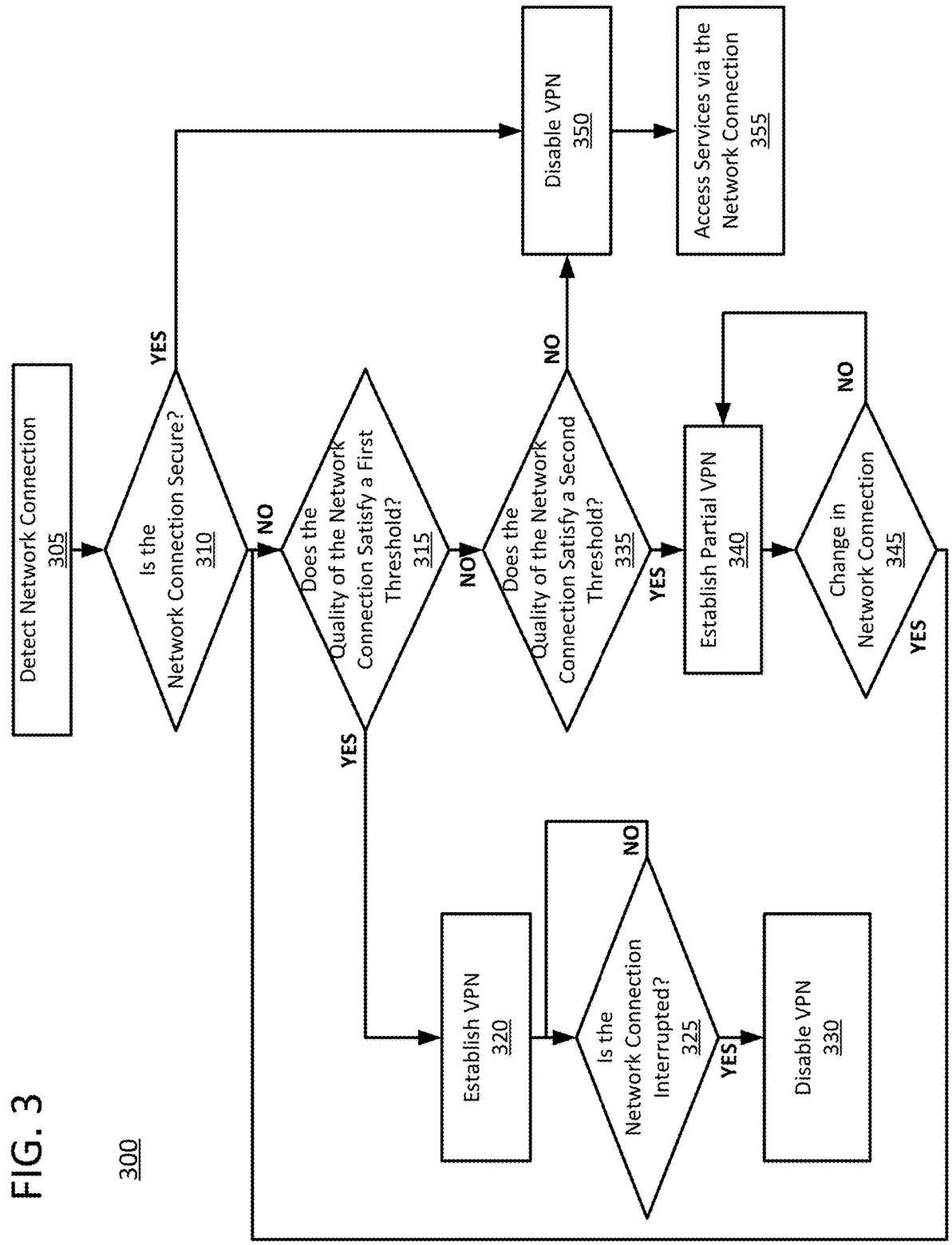
FIG. 3 is a flow chart showing an example method for automatically connecting to a virtual private network (VPN) session via a public network.

As noted above, computing devices may connect to unsecure public networks, which may cause a user's sensitive, secure, and/or confidential data and/or information to be leaked or, otherwise, compromised. Existing VPN solutions oftentimes require a user to manually open an application and enter authentication credentials before establishing a VPN session. FIG. 3 is a flow chart showing steps of an example method 300 for a computing device to automatically establish a VPN session, with a VPN server, via an unsecure public network. Some or all of the steps of method 300 may be performed using one or more computing devices as described herein, including, for example, personal computer 114, laptop computer 115, wireless device 116, and/or mobile devices 125. One or more steps of the example, method 300 may be rearranged, omitted, and/or otherwise modified, and/or other steps may be added.

In step 305, a computing device may detect a network connection. The computing device may be a mobile computing device, such as a laptop computing device, a smart phone, a tablet, a gaming console, an e-reader, a wearable device (e.g., a smart watch, a head-mounted computing device, etc.), or any other suitable portable computing device. The network connection may be a wired connection or a wireless connection. The network connection may be detected by one or more applications executing on the mobile computing device. The one or more applications may comprise one or more application programming interfaces (APIs) configured to communicate and/or interact with one or more APIs associated with an operating system of the computing device. In this regard, the one or more applications may query the operating system, via the one or more APIs, to determine whether the computing device has established a new network connection. Based on determining a new network connection exists, the computing device may determine whether the new network connection is secure, in step 310. The computing device may determine whether the new network connection is secure, for example, based on the computing device recognizing a network associated with the new network connection. That is, the computing device may recognize the network as a network that the computing device has previously connected to. Additionally or alternatively, the computing device may recognize the network as a user's home and/or work network. These determinations may be, for example, based on a Service Set Identifier (SSID) or Base Station Identifier (BSID) stored in a memory of the computing device matching an SSID and/or BSID associated with the network and/or an access point. Additionally or alternatively, the computing device may determine whether the network is secure, for example, based on a level of security associated with the network. For example, the computing device may query the network to determine if the network uses a security algorithm, such as Wired Equivalent Privacy (WEP), Wi-Fi Protected Access (WPA), WPA2, WPA3, etc. Additionally or alternatively, the computing device may determine that the network is unsecure, for example, based on the network being a public network. If the computing device determines that the network is secured, the computing device may disable the VPN application in step 350. Further, the computing device may access network services without establishing a VPN connection, in step 355. The computing device may disable network capabilities and, instead, use a communication network (e.g., cellular network, mobile network) to access the Internet. Alternatively, the computing device may proceed with the steps of establishing a VPN connection via a network connection (e.g., cellular network, mobile network) that is secure, for example, to provide an additional layer of security.

In step 315, and if the network connection is determined in step 310 to be secure, the computing device may determine whether the network connection is a quality connection by determining whether a quality of the network connection satisfies a first threshold. The first threshold may comprise a transmission rate (e.g., a transmission rate of at least 1 Megabit per second (Mbps)). Additionally or alternatively, the quality of the connection may be determined, for example, based on the type of service and/or application being accessed by the computing device. For example, if the computing device is accessing a gaming service, the first threshold may be higher (e.g., 10 Mbps) in order to qualify as a quality connection. The transmission rate may be configurable by a user of the computing device. Additionally, the transmission rate may be configurable for individual applications. That is, the user may define a first minimum transmission rate for establishing a VPN connection for a gaming application. Similarly, the user may define a second minimum transmission rate for establishing a VPN connection for productivity applications, such as word processing applications and/or email. Additionally or alternatively, the first threshold may be based on at least one of: a bit failure rate, a packet loss rate, a signal strength, or the like. The quality of the wireless connection may be checked, for example, using the techniques described above to verify that the network connection can support a VPN connection. That is, if the quality of the connection does not satisfy the threshold, the additional overhead realized by a VPN connection may render the network connection unusable and/or unworkable. Accordingly, the computing device may not establish a VPN connection if the network connection does not satisfy one or more thresholds.

If the network connection is unsecured and qualifies as a quality connection, the computing device may establish a VPN connection, in step 320. As described in connection with FIG. 5, the computing device may establish a VPN connection with a VPN server. If the VPN connection is established between the computing device and the VPN server, the computing device may access one or more applications and/or services via the VPN connection in step 320. The VPN server may act as a proxy server and allow the computing device to browse the Internet, access productivity tools, participate in on-line games, etc.

In step 325, the computing device may determine whether the network connection is interrupted (e.g., disrupted). If the network connection has not been interrupted (e.g., disrupted), the computing device may continue accessing one or more applications and/or services via the VPN connection as described above in step 320. However, if the network connection has been interrupted (e.g., disrupted), the computing device may determine whether the computing device has disconnected from the network, for example, if the computing device has left the network or left the range of an access point associated with the network. Additionally or alternatively, the computing device may determine if a Wi-Fi capability of the computing device has been disabled. For example, the computing device may have entered "Airplane Mode," which may disable the Wi-Fi capability of the computing device. Additionally or alternatively, the computing device may determine that the quality of the connection with the network has fallen below the second threshold. If the computing device is still within range of the network and/or the Wi-Fi capability of the computing device has not been disabled, the computing device may attempt to re-connect to the network. Additionally or alternatively, the computing device may use link aggregation to improve the quality of the connection. However, if the network connection has been interrupted, the computing device may disable the VPN in step 330. Disabling the VPN may comprise tearing down the VPN tunnel and/or re-enabling Internet connectivity via a communication network (e.g., mobile network, cellular network, etc.). Like the assessment performed above, in step 315, the quality of the wireless connection may be checked to verify whether the network connection can support a partial VPN connection or an application-specific VPN connection. In this regard, the quality of the connection may not be sufficient to support a VPN connection, but may be of sufficient quality to support a partial VPN connection and/or an application-specific VPN connection. This may allow a VPN connection to be established for certain applications that do not have significant bandwidth requirements.

If the computing device determines that the network connection does not satisfy the first threshold in step 315, the computing device may determine whether the network connection satisfies a second threshold in step 335. Like the first threshold above, the second threshold may comprise a different transmission rate. The different transmission rate may be lower than the first threshold. For example, the transmission rate for the second threshold may be at least 512 kilobits per second (kbps). Additionally or alternatively, the second threshold may be based on at least one of: a bit failure rate, a packet loss rate, a signal strength, or the like. Additionally or alternatively, the computing device may use link aggregation to supplement the network connection. For example, if the quality of the network connection does not satisfy the first threshold and/or the second threshold, the computing device may obtain data and/or information via a communication network (e.g., mobile network, cellular network, etc.) in addition (or as an alternative) to the network to which a connection was detected in step 305. The computing device may compress and/or cache the data and/or information obtained via the communication network and transmit the data and/or information via the network connection.

If the network connection is unsecured and/or satisfies the second threshold, the computing device may establish a partial VPN connection, in step 340. The partial VPN may establish a secure tunnel with the VPN server, without encryption. The secure tunnel may define one or more secure and/or trusted network devices that may be used to route data and/or information communicated between the computing device and the VPN server.

Additionally or alternatively, the partial VPN may be an application-specific VPN connection. In other words, the partial VPN may be used to transmit and/or receive data and/or information associated with one or more designated applications executing on the computing device, instead of routing data and/or information originating from, or received by, the computing device through the VPN. In step 345, the network connection may be evaluated periodically to determine whether any changes have occurred. For example, these changes may include a change to one or more of the transmission rate, the bit failure rate, the packet loss rate, the signal strength, etc. If a change is detected to the network connection, the method 300 may return to step 315 to re-evaluate the network connection. If no change is detected, the computing device may continue to access one or more applications and/or services using the partial VPN established in step 340.

If the computing device determines in step 335 that the network connection does not satisfy the second threshold, the computing device may disable the VPN application in step 350, and the computing device may access the network without establishing a VPN connection in step 355. Alternatively, the computing device may disconnect from the network connection and access Internet-based applications and/or services via a communications network (e.g., mobile network, cellular network, etc.) instead of the network to which a connection was detected in step 305.

In addition to the one or more network conditions (e.g., the transmission rate, the bit failure rate, the packet loss rate, the signal strength, etc.) described above, the computing device may consider one or more additional factors to determine whether to establish a VPN connection between the computing device and the VPN server. A risk profile associated with a user of the computing device may be considered, for example, in addition to the quality of the connection and/or whether the connection is secured. A risk profile may comprise a rating of the user associated with the computing device. The rating may indicate the user's willingness (or unwillingness) to engage in risky behavior. For example, an older person who has succumbed to phishing attempts previously may have a higher risk rating than a younger person who has avoided phishing attempts and/or visiting malicious websites. A risk rating above a predetermined risk threshold may cause a VPN connection to be established, for example, even though the network connection is secure and/or the quality of the connection is low (e.g., below the first threshold of step 315). The risk threshold which triggers establishment of a VPN connection may be configured by a user.

Additionally or alternatively, the computing device may consider a context associated with a user's activity to determine whether to establish the VPN connection. The context may comprise a geographic location of the user. For example, if the user is travelling internationally, the computing device may establish the VPN connection, regardless of whether the network is secure or the quality of the connection. The context may also or alternatively comprise a type of work or application being accessed by the user. For example, if the user is playing an online game or streaming content, the computing device may not establish the VPN connection, for example, to reduce overhead associated with content that consumes a significant amount of bandwidth. Alternatively, if the user is accessing a productivity tool, such as email or a word processing application, the computing device may establish a VPN connection to secure the sensitive data and/or information being accessed, despite whether the network is secure or the quality of the connection.

By using the criteria above to determine whether to establish a VPN connection, VPN connections may be avoided, for example, if networks are known and/or secure. Additionally, VPN connections may also be avoided if network conditions are not conducive to establishing a VPN connection. That is, the techniques described herein prevent establishing a VPN connection if network conditions would render the VPN connection unusable and/or unworkable.

Figure 4A:
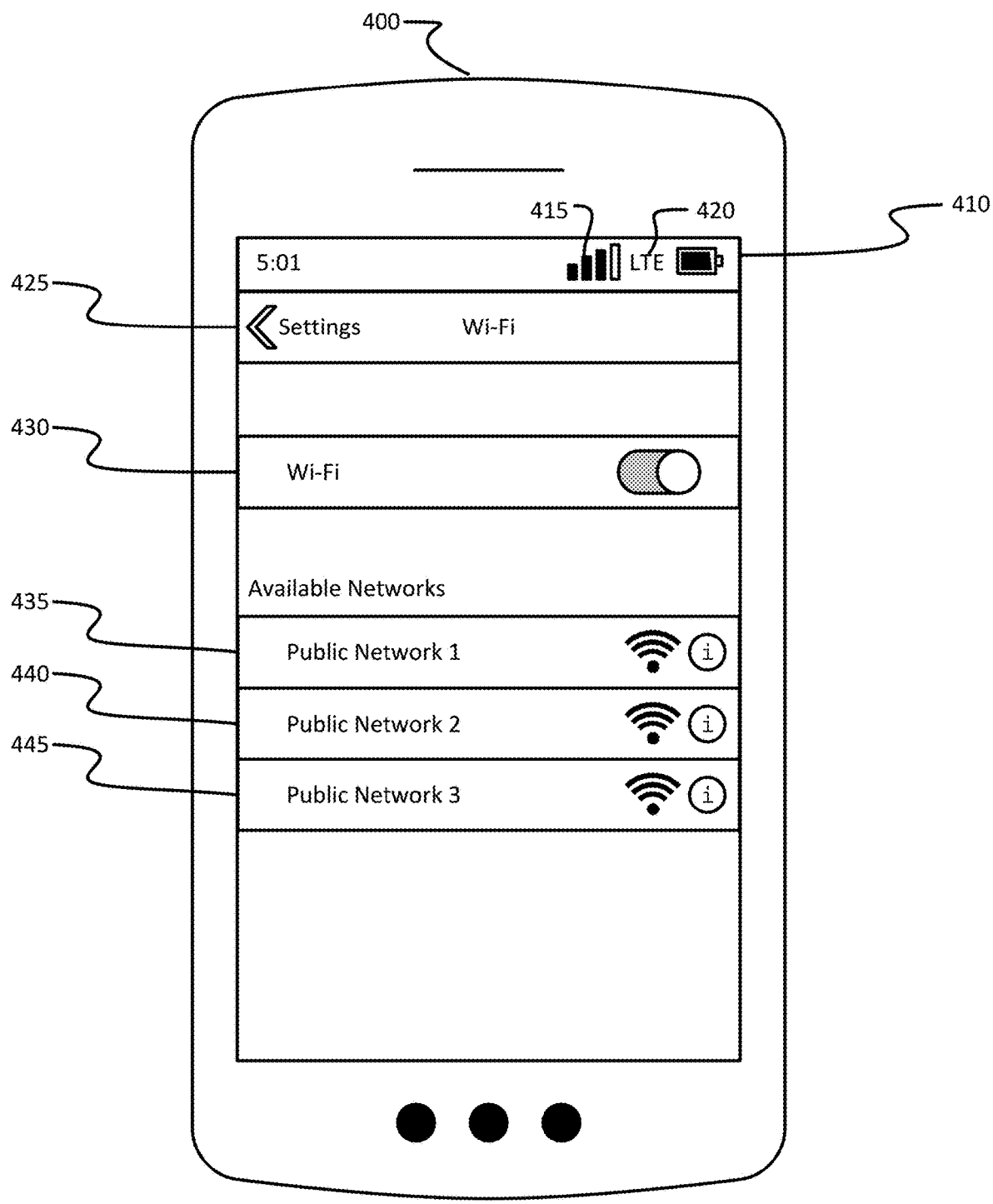
FIGS. 4A-4C show an example of a mobile device establishing a VPN connection via a public network.
Figure 4B:
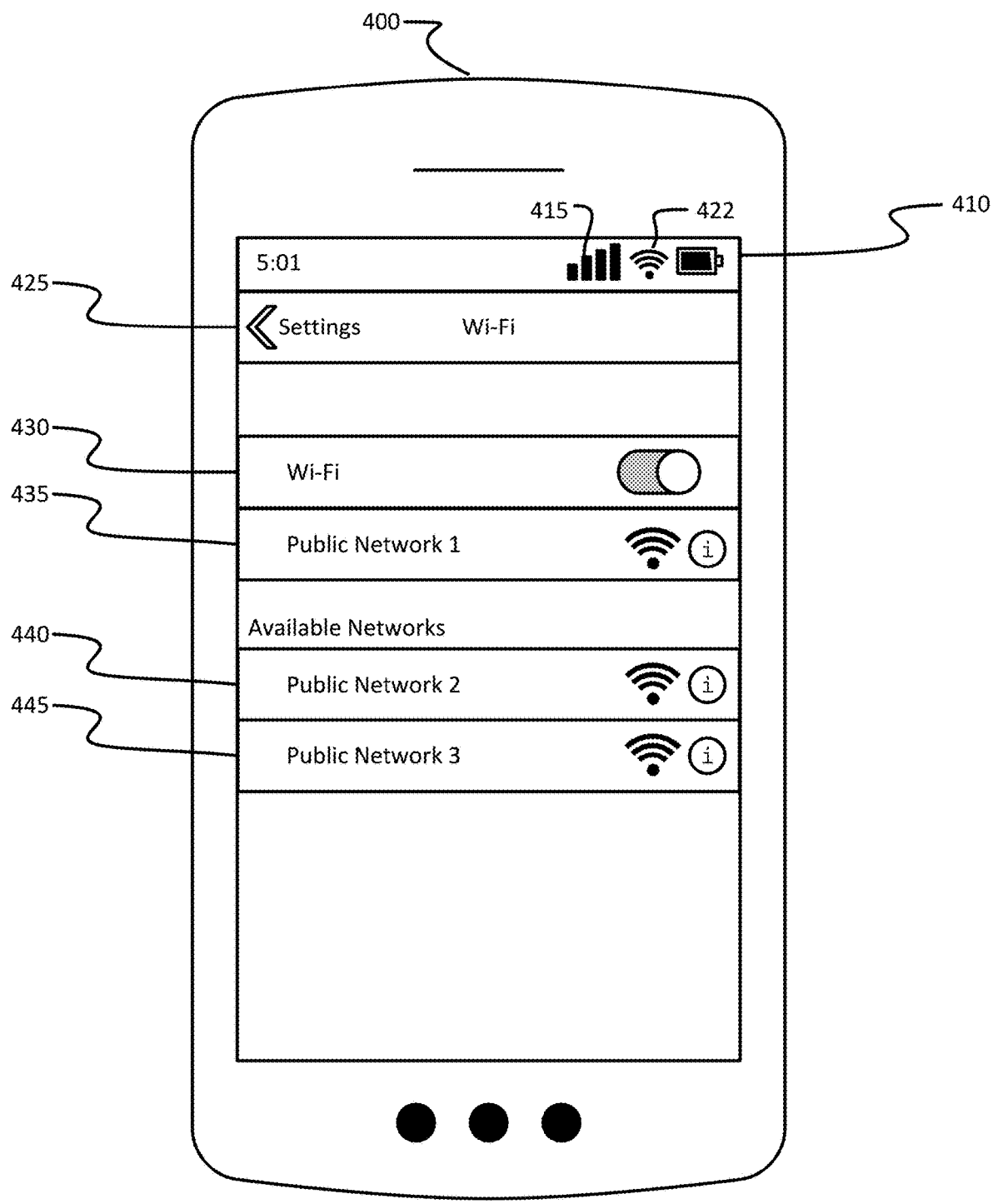
Figure 4C:
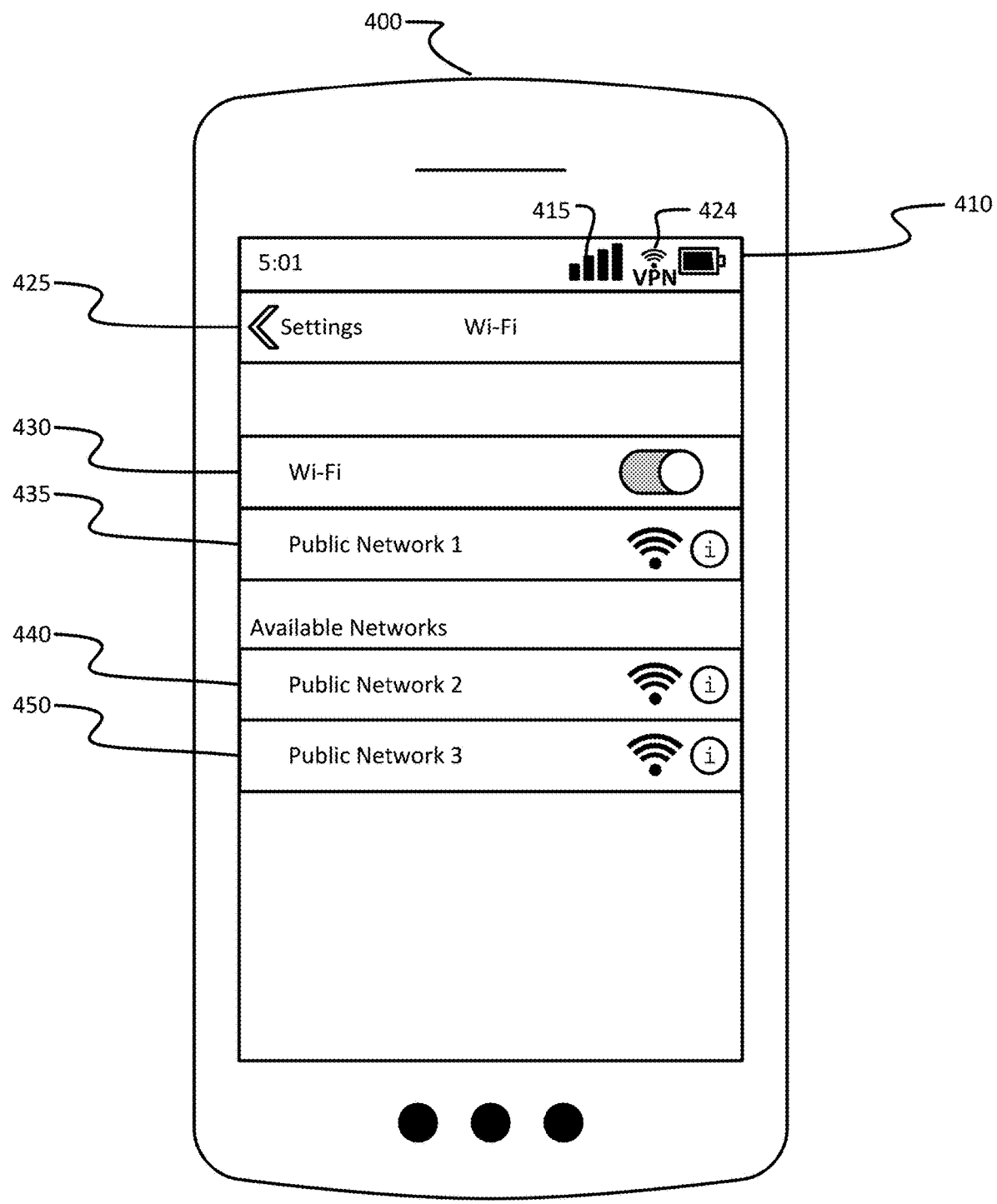

FIGS. 4A-4C show an example of a mobile device 400 connecting to a public network. The mobile device 400 may comprise, for example, the mobile device 125 of FIG. 1. FIG. 4A shows an example of a mobile device 400 comprising a display 410. The display 410 may comprise at least a first icon 415 and a second icon 420. The first icon 415 may indicate a signal strength, while the second icon 420 may indicate a type of network connection. As shown in FIG. 4A, the second icon 420 indicates that the mobile device 400 is connected to a cellular network (e.g., an LTE (Long Term Evolution) mobile network). Additionally, the display 410 may comprise a header field 425. As shown in FIG. 4A, the header field 425 indicates a Wi-Fi settings interface. The Wi-Fi settings interface may comprise a toggle switch 430 and/or a list of available networks (e.g., a first public network 435, a second public network 440, a third public network 445). The toggle switch 430 may allow a user to enable and/or disable Wi-Fi capabilities. That is, if Wi-Fi capabilities are enabled, the mobile device 400 may connect to one or more Wi-Fi networks. Similarly, if Wi-Fi capabilities are disabled, the mobile device 400 may disconnect from any Wi-Fi networks that the mobile device 400 may be connected to. Additionally, the mobile device 400 may not connect to any new networks, for example, if Wi-Fi capabilities are disabled. As shown in FIG. 4A, the toggle switch 430 is enabled, which may allow the mobile device 400 to connect to one or more wireless networks. The list of available networks may allow a user to select a wireless network to connect to. As shown in FIG. 4A, the mobile device 400 may present three networks (e.g., the first public network 435, the second public network 440, the third public network 445) which are within range of mobile device 400.

FIG. 4B shows the mobile device 400 connected to the first public network 435. In this regard, the user of the mobile device 400 may have selected the first public network 435 in FIG. 4A. As noted above, the first public network 435 may be determined to be unsecure based on the first public network 435 being a public network, accessible to anyone. The first public network 435 may be displayed below the toggle switch 430. Additionally, the second icon 420 may be replaced by a third icon 422. The third icon 422 may indicate that the mobile device 400 is connected to a wireless computer network (e.g., Wi-Fi network). Upon detecting the connection to the wireless network, the mobile device 400 may perform the method 300 to determine whether to establish a VPN connection. As noted above, the mobile device 400 (e.g., an application executing on mobile device 400) may determine whether the connection with the first public network 435 is secure. Additionally, the mobile device 400 (e.g., an application executing on the mobile device 400) may determine whether the connection with the first public network 435 is a quality connection. Additionally or alternatively, the mobile device 400 (e.g., the application executing on the mobile device 400) may consider the additional factors (e.g., user's risk profile, context of the connection, etc.) in determining whether to establish the VPN connection. If the first public network 435 is secure, the quality of the connection with the first public network 435 no longer satisfies at least the second threshold, and/or there are additional factors weighing against establishment of a VPN connection, the mobile device 400 (e.g., the application executing on the mobile device 400) may not establish a VPN connection. In this regard, the mobile device 400 (e.g., the application executing on the mobile device 400) may access one or more services via the first public network 435, without a VPN connection. However, if the first public network 435 is not secure, the connection with the first public network 435 is a quality connection (e.g., greater than or equal to a threshold), and/or there are additional factors weighing in favor of establishing a VPN connection, the mobile device 400 may establish a VPN connection.

FIG. 4C shows the mobile device 400 establishing a VPN connection via first public network 435. The display 410 includes the first icon 415 and a fourth icon 424. As noted above, the first icon 415 may indicate a signal strength. The fourth icon 424 may be an updated Wi-Fi connection icon to convey that mobile device 400 has established a VPN connection. That is, the display 410 may cause an indication of the VPN connection to be displayed, for example, based on the mobile device 400 establishing a VPN connection with a VPN server. As shown in FIG. 4C, the fourth icon 424 comprises the Wi-Fi symbol with the letters "VPN" underneath. Other icons or indicia may also or alternatively be used to convey that mobile device 400 has established a VPN connection. For example, the mobile device 400 (e.g., the application executing on the mobile device 400) may change the color of the Wi-Fi connection icon. Also or alternatively, the mobile device 400 may cause a symbol (e.g., a padlock), or other information, to be displayed as an overlay on the Wi-Fi connection icon.

Figure 5:
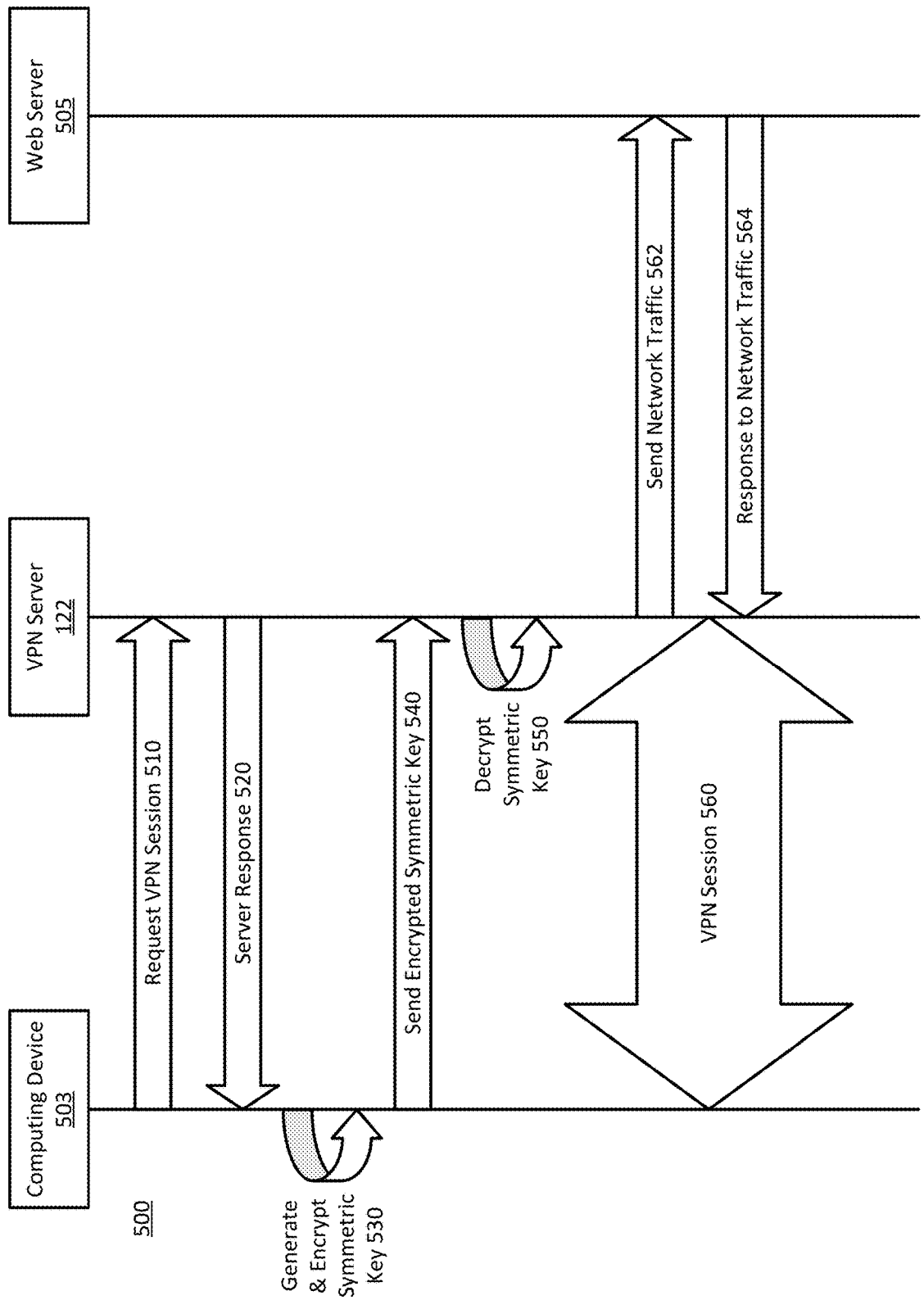
FIG. 5 is a diagram showing an example method for automatically establishing a VPN connection with a VPN server.

If the mobile device 400 determines to establish a VPN connection with a VPN server, the mobile device 400 may perform a handshake with the VPN server to establish the VPN connection. FIG. 5 shows a flow chart of a method 500 for establishing a VPN connection between a computing device and a VPN server. FIG. 5 shows a computing device 503, a VPN server 122, and a web server 505. The computing device 503 may be any of the devices described above, including, for example, the mobile device 125 or the mobile device 400.

As discussed above with respect to FIG. 3, a computing device, such as computing device 503, may automatically establish a VPN connection with a VPN server, for example, based on detecting a connection to an unsecure network and based on a determination that the connection qualifies as a quality connection. In step 510, the computing device 503 may send (e.g., transmit) a request to establish a VPN connection to the VPN server 122. The request to establish the VPN connection may comprise authentication credentials, such as a username and password, a certificate, a token, and/or other authentication data. Additionally or alternatively, the request to establish the VPN connection may comprise a cipher suite. A cipher suite may define a set of encryption algorithms that the computing device 503 may use. Additionally or alternatively, the request to establish the VPN connection may comprise a first public key. The first public key may be used, by the VPN server 122, to derive a symmetric key. For example, the VPN may derive the symmetric key according to a key agreement protocol, such as Diffie-Hellman key exchange or a variant thereof (e.g., elliptic curve Diff-Hellman (ECDH) key exchange).

In step 520, the VPN server 503 may respond to the request to establish the VPN connection from the computing device 503. The response may comprise verification of the authentication credentials. Additionally or alternatively, the response may comprise an indication of a selection of one of the encryption algorithms in the cipher suite. Additionally or alternatively, the response may comprise a certificate associated with the VPN server 122. The certificate may comprise a public key of the VPN server 122. Also or alternatively, the response may comprise a second public key, which may be used by the computing device 503, to derive the symmetric key using the key agreement protocol, discussed above.

In step 530, the computing device 503 may generate a symmetric key. The symmetric key may be generated using a key derivation function (KDF). If the computing device 503 and the VPN server 122 are using a key agreement protocol, for example, the computing device 503 may derive the symmetric key using the second public key received from the VPN server 122 and a first private key, associated with the first public key described above. If the computing device 503 and the VPN server 122 are not using a key agreement protocol, the computing device 503 may, for example, encrypt the symmetric key according to an asymmetric encryption algorithm (e.g., RSA) and the second public key received from the VPN server 122. In step 540, the computing device 503 may send the encrypted symmetric key to the VPN server 122. In step 550, the VPN server 122 may decrypt the encrypted symmetric key using a second private key associated with the second public key. If the computing device 503 and the VPN server 122 are using a key agreement protocol, steps 540 and 550 may be omitted. Once the symmetric key has been established by both the computing device 503 and the VPN server 122, a VPN session between the computing device 503 and the VPN server 122 may be established in step 560. During the VPN session, the computing device 503 and the VPN server 122 may exchange data and/or information that has been encrypted with the symmetric key. That is, the computing device 503 may encrypt data and/or information before transmitting the encrypted data and/or information to the VPN server 122. The VPN server 122 may receive the encrypted data and/or information and decrypt it using the symmetric key. The VPN server 122 may decrypt less than all encrypted data and/or information received from the computing device 503 via the VPN session 560. A decrypted portion of the data and/or information may indicate a destination for the encrypted data and/or information. The destination may comprise an application server and/or a website. The data and/or information that remains encrypted may be encrypted under a different protocol, which the VPN server 122 may not be able to decrypt. For example, the data and/or information may comprise login information to access a user's bank account. The VPN server 122 may be able to decrypt a first portion of the data and/or information comprising a uniform resource locator (URL) and/or web address, but unable to decrypt a second portion of the data and/or information comprising a user's login credentials and/or authentication data. Based on decrypting the data and/or information, the VPN server 122 may review the data and/or information received from the computing device 503, via the VPN session 560, and send the data and/or information to one or more services and/or applications hosted on the same network as the VPN server 122. Additionally or alternatively, the VPN server 122 may act as a proxy server and send the data and/or information, received from the computing device 503 via the VPN session 560, on to another server, such as web server 505, as illustrated in step 562. In step 564, the VPN server 122 may receive a response from the web server 505. The VPN server 122 may then encrypt, using the symmetric key, the response from the web server 505. The encrypted response may be sent to the computing device 503 via the VPN session 560. By automatically establishing a VPN connection, a hacker, or third-party, may be prevented from sniffing the traffic originating from the computing device 503. This may prevent data leakage and secure the user's privacy while accessing the Internet via unknown and/or untrusted networks. Moreover, using the VPN connection 560 and/or the VPN server 122 as a proxy may obfuscate the location of the computing device 503, which may further enhance the security and/or privacy associated with the computing device 503.

Figure 6:
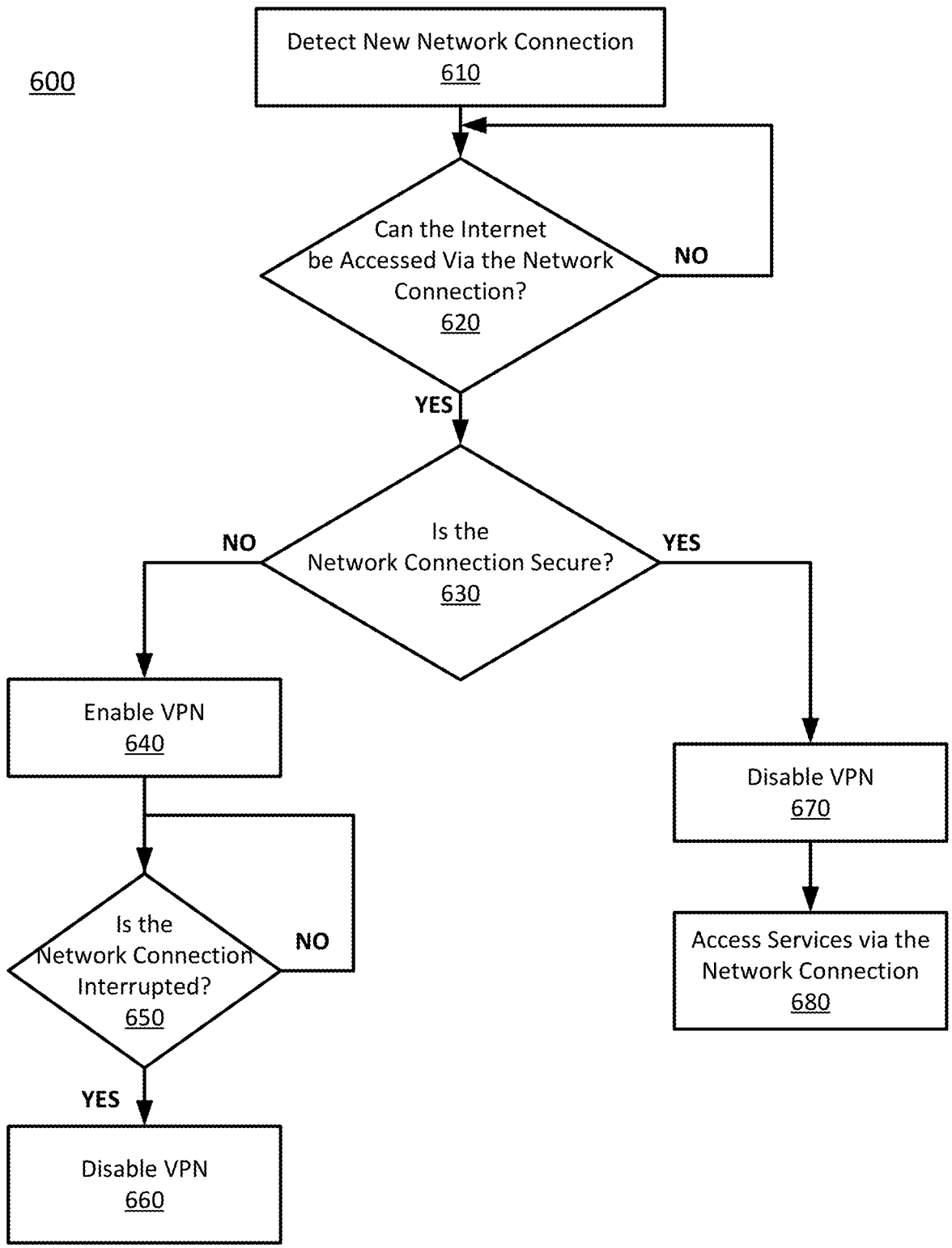
FIG. 6 is a flow chart showing an example method for automatically establishing a VPN connection via a public network with a captive portal.

In some instances, public networks, such as those offered by hotels, may require a user to login via a captive portal before the user can access the Internet via the public network. FIG. 6 is a flow chart of a method 600 for automatically establishing a VPN connection after connecting to the Internet via a captive portal. Some or all of the steps of method 600 may be performed using one or more computing devices as described herein, including, for example, the personal computer 114, the laptop computer 115, the wireless device 116, the mobile devices 125, and/or the mobile device 400.

In step 610, a computing device, such as a mobile computing device described above, may detect a network connection associated with a public network. The network connection may be detected by one or more applications, comprising one or more APIs configured to communicate with one or more operating system APIs, executing on the mobile computing device. As noted above, the one or more applications may monitor the operating system, via the one or more APIs, to detect if a new network connection has been detected.

In step 620, the computing device may determine whether the Internet can be accessed via the network connection. The public network may comprise an active portal. The captive portal may be a web page, or other suitable login prompt, that may be presented to newly connected users of the public network prior to being given access to the Internet and/or other network resources (e.g., a printer). Before being able to access the Internet, the captive portal may require at least one of: authentication, payment, acceptance of a terms of use, terms of conditions, or another suitable policy. The computing device may iteratively check to determine if one or more conditions have been satisfied to establish Internet connectivity. If no Internet connectivity is detected, step 620 may be repeated, to check if the one or more conditions have been satisfied, until Internet connectivity is detected. Alternatively, step 620 may be repeated until the public network and/or the network connection are no longer detected. If the public network and/or the network connection are no longer detected, the computing device may enable a communications network (e.g., mobile network, cellular network, etc.) to access Internet-based applications and/or services.

In step 630, the computing device may determine whether the new network connection is secure. The computing device may determine whether the new network connection is secure, for example, if the computing device recognizes a network associated with the new network connection. For example, the computing device may recognize the SSID or BSID associated with the new network connection as being associated with a SSID or BSID stored in a memory of the computing device. Additionally or alternatively, the computing device may also determine whether the new network is secure, for example, based on a level of security (e.g., WEP, WPA2, WPA3, WPA3, etc.) associated with the network. If the computing device determines that the network is secured, the computing device may disable the VPN application in step 670. Further, the computing device may access services and/or websites, via the network connection, without establishing a VPN connection, in step 680. Although not shown in FIG. 6, the computing device may also determine whether the network connection qualifies as a quality connection. For example, the computing device may evaluate whether the network connection satisfies one or more thresholds, for example, based on or in response to determining that the network connection is not secure. As noted above, a quality connection may comprise a transmission rate greater than or equal to 1 Mbps. Additionally or alternatively, the computing device may determine whether the network connection qualifies as a quality connection based on at least one of: a bit failure rate, a packet loss rate, a signal strength, or the like. Similar to the description above, the computing device may disable the VPN application, for example, if the computing device determines that the network connection does not satisfy one or more thresholds. The computing device may evaluate the quality of the network connection after several steps. For example, the computing device may determine the quality of the network connection after step 630 and before step 640 and/or step 670. Additionally or alternatively, the computing device may determine the quality of the network connection as part of step 630 or step 650. As noted above, the computing device may drop the network connection and/or connect to the Internet via a communication network (e.g., mobile network, cellular network, etc.). As noted above, additional factors may be used to determine whether to establish a VPN connection between the computing device and the VPN server. For example, a risk profile associated with a user of the computing device may be considered. Alternatively, a context associated with user's activity may be used to determine whether to establish the VPN connection. The context may comprise a geographic location of the user and/or a type of work or application being accessed by the user.

If Internet connectivity is detected and the network connection is unsecured, the computing device may establish a VPN connection with a VPN server, in step 640. Additionally or alternatively, the computing device may establish a partial VPN, for example, based on a determination that the quality of the network connection does not satisfy a first threshold (e.g., <1 Mbps), but satisfies a second threshold (e.g., ≥512 kbps) as discussed above with respect to FIG. 3. If the VPN connection has been established with the VPN server, the computing device may access one or more applications and/or services via the VPN connection. For example, the computing device may browse the Internet, access productivity tools, participate in on-line games, etc.

In step 650, the computing device may determine whether the network connection is interrupted. If the network connection has not been interrupted, the computing device may continue accessing one or more services via the VPN connection as described above in step 640. However, if the network connection has been interrupted, the computing device may determine whether the computing device has been disconnected from the network and/or whether a user has disabled Wi-Fi capability of the computing device. Additionally or alternatively, the network connection may be interrupted, for example, based on the quality of the network connection no longer satisfying at least one of the first threshold and/or the second threshold. However, if the network connection has been interrupted (or disabled), the computing device may disable the VPN in step 670. Disabling the VPN may comprise tearing down the VPN tunnel and/or re-enabling Internet connectivity via a communication network (e.g., mobile network, cellular network, etc.). By automatically establishing a VPN connection based on the factors discussed above, a malicious user may be prevented from intercepting (e.g., sniffing) network traffic. Additionally, automatically establishing a VPN connection may prevent data leakage and secure the user's privacy while accessing the Internet via unknown and/or untrusted networks.

Figure 7A:
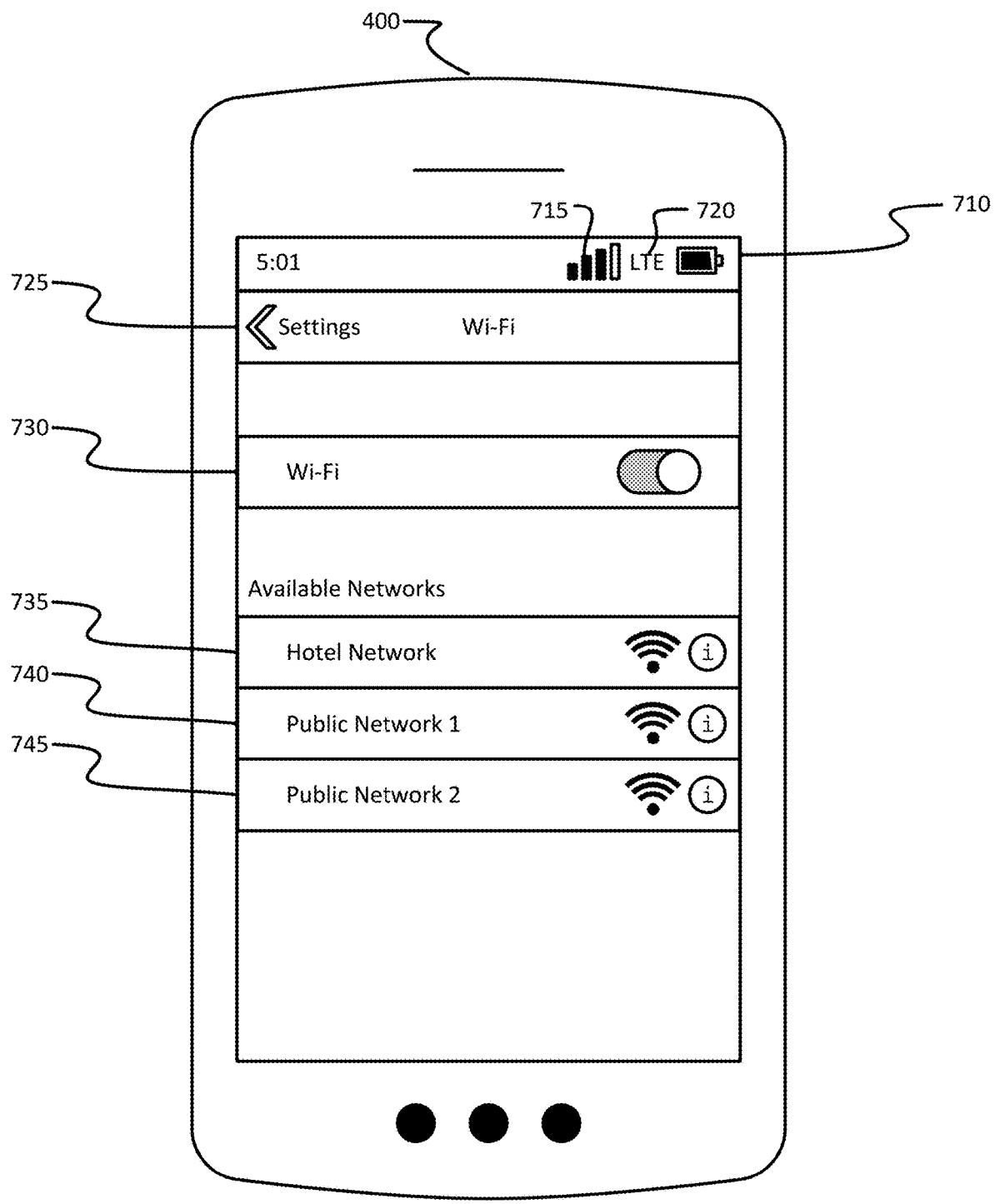
FIGS. 7A-7D show an example of a mobile device automatically establishing a VPN connection through an active portal.

FIGS. 7A-7D show an example of the mobile device 400 connecting to a public network through a captive portal. FIG. 7A shows an example of the mobile device 400 comprising a display 710 that includes at least a first icon 715 and a second icon 720. Similar to the description of FIGS. 4A-4C above, first icon 715 may indicate a signal strength and the second icon 720 may indicate a type of network connection (e.g., Wi-Fi connection, communication network, cellular network, mobile network, etc.). Additionally, display 710 may also comprise header field 725 that indicates a Wi-Fi settings interface. The Wi-Fi settings interface may comprise a toggle switch 730 and/or a list of available networks (e.g., first hotel network 435, first public network 440, second public network 445) Like toggle switch 430 above, toggle switch 730 may allow a user to enable and/or disable Wi-Fi capabilities. The list of available networks may allow a user to select a wireless network. As shown in FIG. 7A, mobile device 400 may present three networks (e.g., first hotel network 435, first public network 440, second public network 445).

Figure 7B:
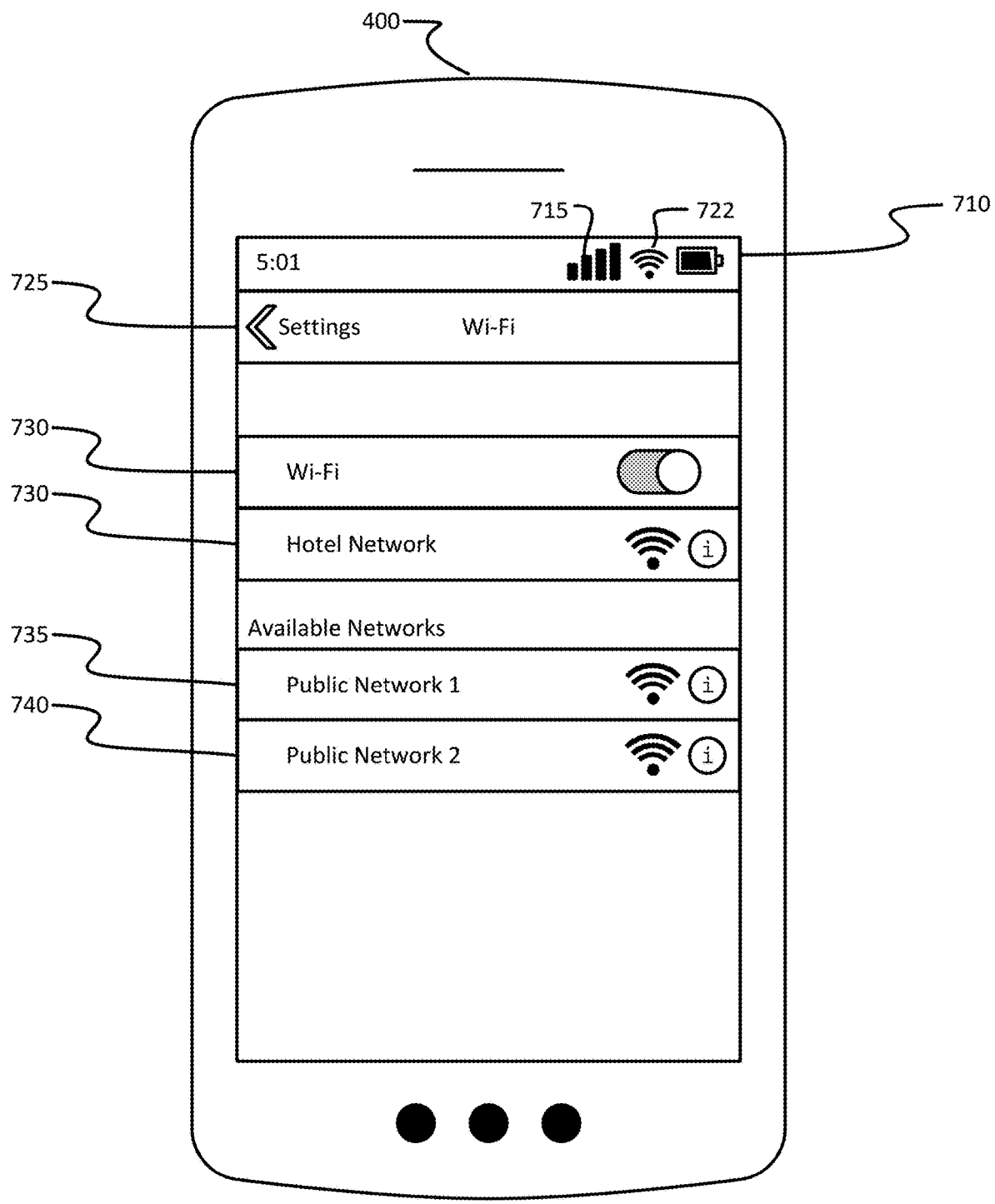

FIG. 7B shows mobile device 400 connected to first hotel network 735. In this regard, the user of mobile device 400 may have selected the first hotel network 735 in FIG. 7A. Accordingly, first hotel network 735 may be displayed below toggle switch 730. The second icon 720 may also be replaced by third icon 722, which indicates that mobile device 400 is connected to a wireless network (i.e., first hotel network 735). If the connection to the wireless network is detected, mobile device 400 may perform method 600 to determine whether to establish a VPN connection. As noted above, mobile device 400 (e.g., an application executing on mobile device 400) may determine whether the connection with first hotel network 735 includes Internet connectivity. Based on a determination that the connection with first hotel network 735 does not include Internet connectivity, the user of mobile device 400 may open up a browser window to access a captive portal.

Figure 7C:
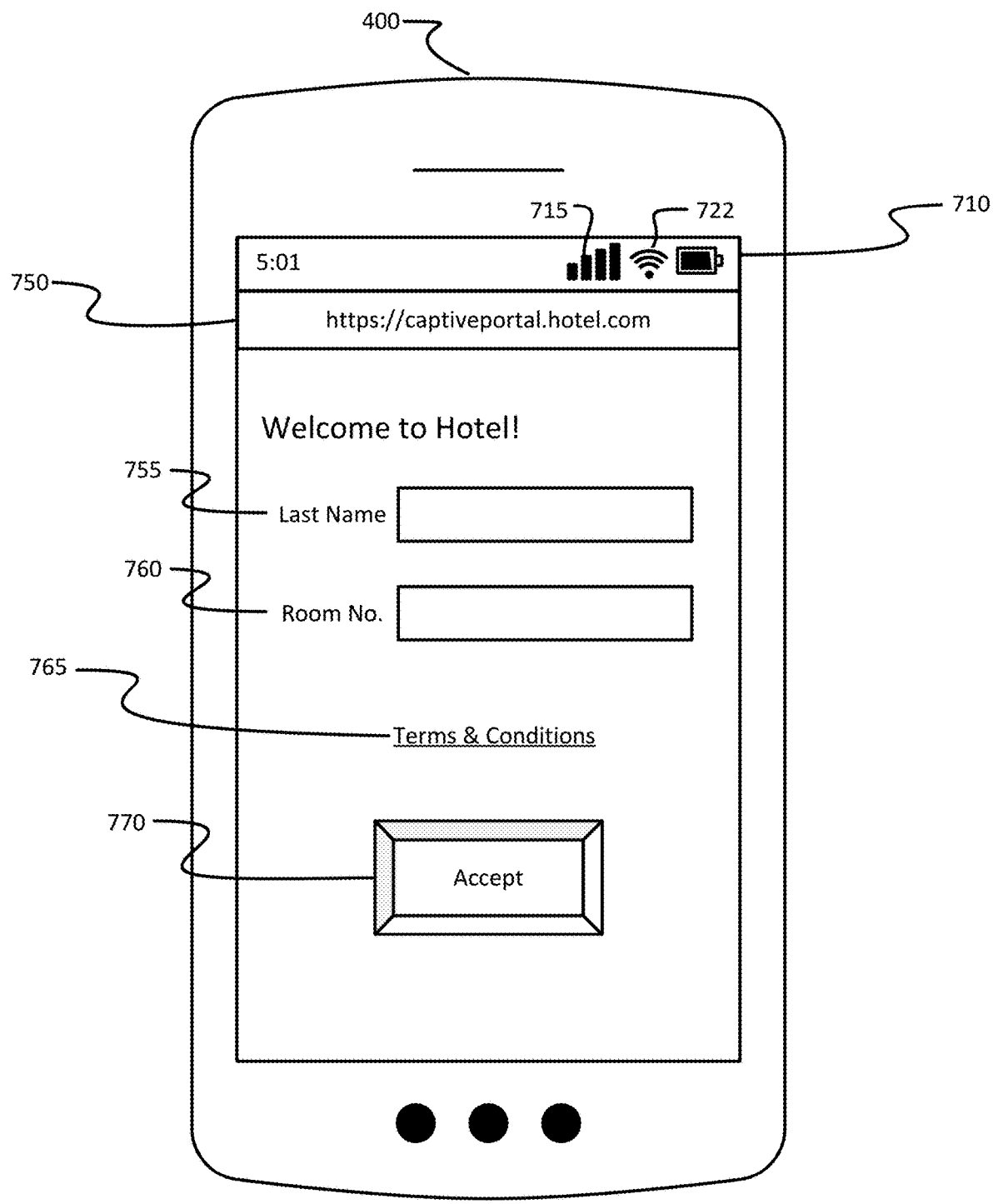

FIG. 7C shows an example of a captive portal displayed via mobile device 400. Mobile device 400 still comprises a display 710 that includes at least a first icon 715 and a third icon 722. However, mobile device 400 may display a browser window comprising the captive portal. The browser window may comprise address field 750, a first field 755, a second field 760, a first link 765, and/or an acceptance button 770. As shown in FIG. 7C, address field 750 may comprise a uniform resource locator (e.g., web address) for the captive portal. First field 755 may request a user's last name and second field 760 may request the user's room number. The first link 765 may comprise another uniform resource locator. First link 765, if clicked, may cause the terms and conditions for using first hotel network 735 to be displayed on mobile device 400. Acceptance button 770, if selected, may indicate that the user accepts the terms and conditions for using first hotel network 735. If the user does not select acceptance button 770 and/or their last name and/or room number do not match a guest at the hotel, the user may be blocked from access the Internet and/or any network resources via first hotel network 735.

Figure 7D:
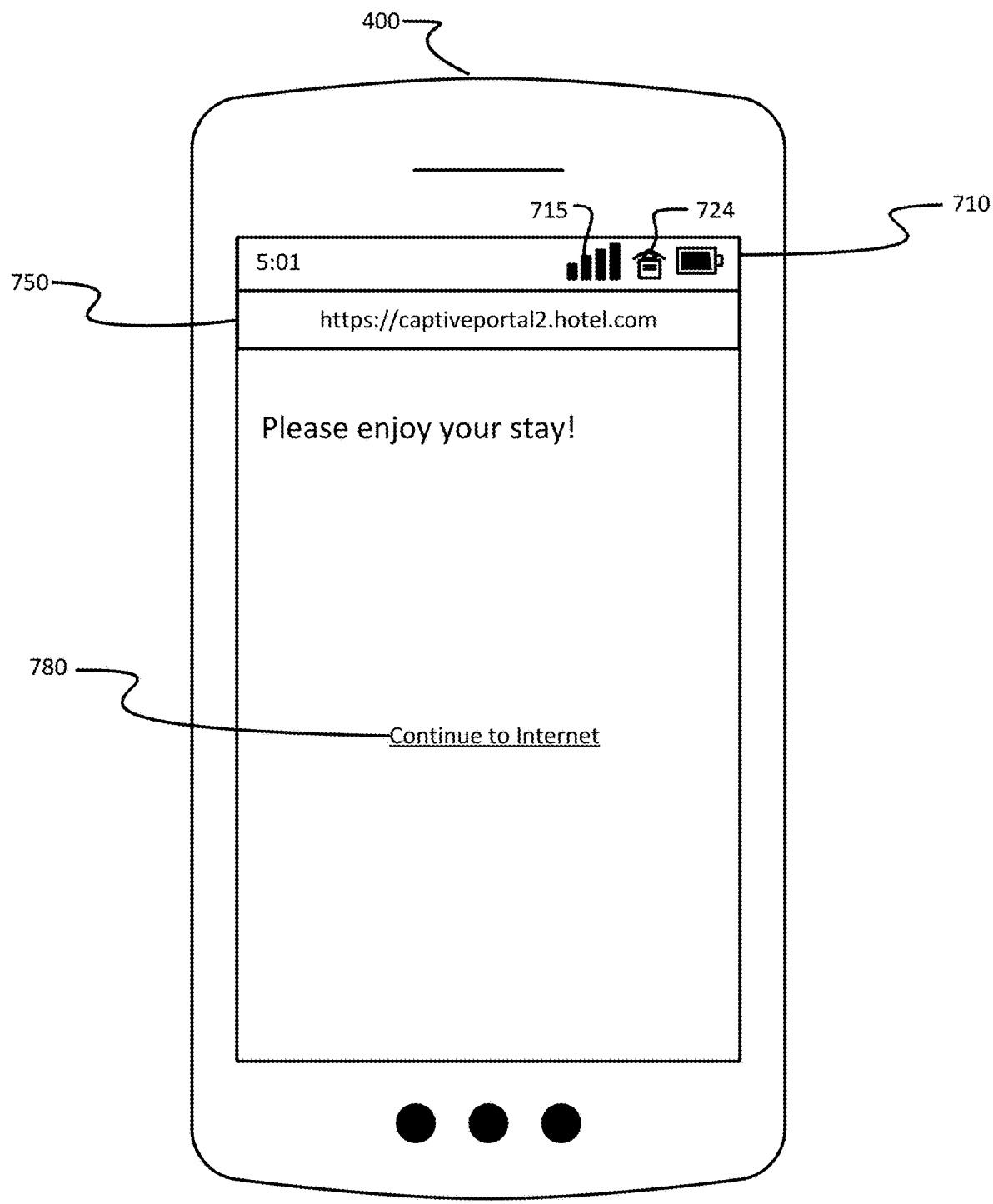

After the user has accepted the terms and conditions, mobile device 400 may evaluate the network connection. For example, mobile device 400 may determine whether the network connection is secure and/or whether the whether the connection is a quality connection. If first hotel network 735 is not secure and/or the connection is a quality connection (e.g., greater than or equal to a threshold), mobile device 400 may establish a VPN connection with a VPN server. FIG. 7D shows mobile device 400 having established a VPN connection via first hotel network 735. In this regard, FIG. 7D shows mobile device 400 with a second webpage displayed in the web browser. The second webpage may comprise the address field 750 and a second link 780. The address field 750 may display a second uniform resource locator, while the second link 780 may allow the user to access the Internet. Display 710 may also update the third icon 722 to a fourth icon 724. As noted above, the fourth icon 724 may be an updated Wi-Fi connection icon that indicates that mobile device 400 has established a VPN connection. As shown in FIG. 7D, fourth icon 724 comprises the Wi-Fi symbol with a lock overlain. Using the methods, systems, and apparatus above to automatically establish a VPN connection may prevent a malicious user from intercepting network traffic. Furthermore, automatically establishing a VPN connection may prevent data leakage and secure the user's privacy while accessing the Internet via unknown and/or untrusted networks.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   determining, by a computing device and based on the computing device being connected to a wireless network, whether an Internet is accessible via the wireless network connection;
   determining, based on the Internet being accessible via the wireless network connection, whether the wireless network connection is secure; and
   establishing, via the wireless network connection, based on a determination that the Internet is accessible via the wireless network connection, based on a determination that the wireless network connection is not secure, and based on a risk profile associated with a user of the computing device, a virtual private network (VPN) connection.

2. The method of claim 1, wherein the VPN connection comprises a partial VPN based on a determination that a quality of the wireless network connection does not satisfy a threshold.

3. The method of claim 1, wherein the VPN connection comprises an application-specific VPN connection.

4. The method of claim 1, wherein the establishing the VPN connection is further based on an application being used by a user of the computing device.

5. The method of claim 1, wherein the determination that Internet is accessible via the wireless network connection comprises:
   receiving an indication that a user of the computing device has agreed to terms and conditions for using the wireless network connection.

6. The method of claim 1, further comprising:
   determining that a quality of the wireless network connection is below a second threshold; and
   tearing down, based on a determination that the quality of the wireless network connection is below the second threshold, the VPN connection.

7. A method comprising:
   determining, by a computing device and based on the computing device being connected to a wireless network, whether the wireless network connection is secure;
   determining, based on determining whether the wireless network connection is secure, a quality of the wireless network connection; and
   based on a determination that the quality of the wireless network connection does not satisfy a threshold, sending data via the wireless network connection without establishing a virtual private network (VPN) connection.

8. The method of claim 7, wherein the sending data via the wireless network connection without establishing the VPN connection is further based on a determination that the quality of the wireless network connection does not satisfy a second threshold.

9. The method of claim 7, wherein the sending data via the wireless network connection without establishing the VPN connection is further based on a determination that the wireless network connection is secure.

10. The method of claim 9, wherein the determining whether the wireless network connection is secure comprises determining whether the wireless network connection uses at least one of: Wired Equivalent Privacy (WEP), Wi-Fi Protected Access (WPA).

11. The method of claim 7, wherein the determination that the quality of the wireless network connection does not satisfy the threshold is based on at least one of:
a bit failure rate;
a packet loss rate;
a transmission rate; or
a signal strength.

12. The method of claim 7 wherein the sending data via the wireless network connection without establishing the VPN connection is further based on a determination that a user is accessing a gaming service.

13. A computing device comprising:
one or more processors; and
memory storing instructions that, when executed by the one or more processors, cause the computing device to:
determine, based on the computing device being connected to a wireless network, whether an Internet is accessible via the wireless network connection;
determine, based on the Internet being accessible via the wireless network connection, whether the wireless network connection is secure; and
establish, via the wireless network connection, based on a determination that the Internet is accessible via the wireless network connection, based on a determination that the wireless network connection is not secure, and based on a risk profile associated with a user of the computing device, a virtual private network (VPN) connection.

14. The computing device of claim 13, wherein the VPN connection comprises a partial VPN based on a determination that a quality of the wireless network connection does not satisfy a threshold.

15. The computing device of claim 13, wherein the VPN connection comprises an application-specific VPN connection.

16. The computing device of claim 13, wherein the instructions, when executed by the one or more processors, cause the computing device to establish the VPN connection further based on an application being used by a user of the computing device.

17. The computing device of claim 13, wherein the instructions, when executed by the one or more processors, cause the computing device to determine that Internet is accessible via the wireless network connection by receiving an indication that a user of the computing device has agreed to terms and conditions for using the wireless network connection.

18. The computing device of claim 13, wherein the instructions, when executed by the one or more processors, cause the computing device to:
determine that a quality of the wireless network connection is below a second threshold; and
tear down, based on a determination that the quality of the wireless network connection is below the second threshold, the VPN connection.

19. A computing device comprising:
one or more processors; and
memory storing instructions that, when executed by the one or more processors, cause the computing device to:
determine, based on the computing device being connected to a wireless network, whether the wireless network connection is secure;
determine, based on determining whether the wireless network connection is secure, a quality of the wireless network connection; and
based on a determination that the quality of the wireless network connection does not satisfy a threshold, send data via the wireless network connection without establishing a virtual private network (VPN) connection.

20. The computing device of claim 19, wherein the instructions, when executed by the one or more processors, cause the computing device to send data via the wireless network connection without establishing the VPN connection further based on a determination that the quality of the wireless network connection does not satisfy a second threshold.

21. The computing device of claim 19, wherein the determination that the quality of the wireless network connection does not satisfy the threshold is based on at least one of:
a bit failure rate;
a packet loss rate;
a transmission rate; or
a signal strength.

22. The computing device of claim 19, wherein the instructions, when executed by the one or more processors, cause the computing device to send data via the wireless network connection without establishing the VPN connection further based on a determination that a user is accessing a gaming service.

23. The computing device of claim 19, wherein the instructions, when executed by the one or more processors, cause the computing device to send data via the wireless network connection without establishing the VPN connection further based on a determination that the wireless network connection is secure.

24. The computing device of claim 23, wherein the instructions, when executed by the one or more processors, cause the computing device to determine whether the wireless network connection is secure by determining whether the wireless network connection uses at least one of: Wired Equivalent Privacy (WEP), Wi-Fi Protected Access (WPA).

25. A non-transitory computer-readable medium storing instructions that, when executed, configure a computing device to:
determine, based on the computing device being connected to a wireless network, whether an Internet is accessible via the wireless network connection;
determine, based on the Internet being accessible via the wireless network connection, whether the wireless network connection is secure; and
establish, via the wireless network connection, based on a determination that the Internet is accessible via the wireless network connection, based on a determination that the wireless network connection is not secure, and based on a risk profile associated with a user of the computing device, a virtual private network (VPN) connection.

26. The non-transitory computer-readable medium of claim 25, wherein the VPN connection comprises a partial VPN based on a determination that a quality of the wireless network connection does not satisfy a threshold.

27. The non-transitory computer-readable medium of claim 25, wherein the VPN connection comprises an application-specific VPN connection.

28. The non-transitory computer-readable medium of claim 25, wherein the instructions, when executed, configure the computing device to establish the VPN connection further based on an application being used by a user of the computing device.

29. The non-transitory computer-readable medium of claim 25, wherein the instructions, when executed, configure the computing device to determine that Internet is accessible via the wireless network connection by receiving an indication that a user of the computing device has agreed to terms and conditions for using the wireless network connection.

30. The non-transitory computer-readable medium of claim 25, wherein the instructions, when executed, configure the computing device to:
   determine that a quality of the wireless network connection is below a second threshold; and
   tear down, based on a determination that the quality of the wireless network connection is below the second threshold, the VPN connection.

31. A non-transitory computer-readable medium storing instructions that, when executed, configure a computing device to:
   determine, based on the computing device being connected to a wireless network, whether the wireless network connection is secure;
   determine, based on determining whether the wireless network connection is secure, a quality of the wireless network connection; and
   based on a determination that the quality of the wireless network connection does not satisfy a threshold, send data via the wireless network connection without establishing a virtual private network (VPN) connection.

32. The non-transitory computer-readable medium of claim 31, wherein the instructions, when executed, configure the computing device to send data via the wireless network connection without establishing the VPN connection further based on a determination that the quality of the wireless network connection does not satisfy a second threshold.

33. The non-transitory computer-readable medium of claim 31, wherein the determination that the quality of the wireless network connection does not satisfy the threshold is based on at least one of:
   a bit failure rate;
   a packet loss rate;
   a transmission rate; or
   a signal strength.

34. The non-transitory computer-readable medium of claim 31, wherein the instructions, when executed, configure the computing device to send data via the wireless network connection without establishing the VPN connection further based on a determination that a user is accessing a gaming service.

35. The non-transitory computer-readable medium of claim 31, wherein the instructions, when executed, configure the computing device to send data via the wireless network connection without establishing the VPN connection further based on a determination that the wireless network connection is secure.

36. The non-transitory computer-readable medium of claim 35, wherein the instructions, when executed, configure the computing device to determine whether the wireless network connection is secure by determining whether the wireless network connection uses at least one of: Wired Equivalent Privacy (WEP), Wi-Fi Protected Access (WPA).

37. A system comprising:
   a computing device; and
   a server,
   wherein the computing device is configured to:
      determine, based on the computing device being connected to a wireless network, whether an Internet is accessible via the wireless network connection;
      determine, based on the Internet being accessible via the wireless network connection, whether the wireless network connection is secure; and
      establish, via the wireless network connection, based on a determination that the Internet is accessible via the wireless network connection, based on a determination that the wireless network connection is not secure, and based on a risk profile associated with a user of the computing device, a virtual private network (VPN) connection; and
   wherein the server is configured to:
      establish the VPN connection with the computing device.

38. The system of claim 37, wherein the VPN connection comprises a partial VPN based on a determination that a quality of the wireless network connection does not satisfy a threshold.

39. The system of claim 37, wherein the VPN connection comprises an application-specific VPN connection.

40. The system of claim 37, wherein the computing device is configured to establish the VPN connection further based on an application being used by a user of the computing device.

41. The system of claim 37, wherein the computing device is configured to determine that Internet is accessible via the wireless network connection by receiving an indication that a user of the computing device has agreed to terms and conditions for using the wireless network connection.

42. The system of claim 37, wherein the computing device is configured to:
   determine that a quality of the wireless network connection is below a second threshold; and
   tear down, based on a determination that the quality of the wireless network connection is below the second threshold, the VPN connection.

* * * * *